Jan. 8, 1963  J. P. MORLEY ET AL  3,072,449
POLYTETRAFLUOROETHYLENE BUSHING-TYPE BEARING
AND METHOD OF FORMING SAME
Filed April 29, 1959
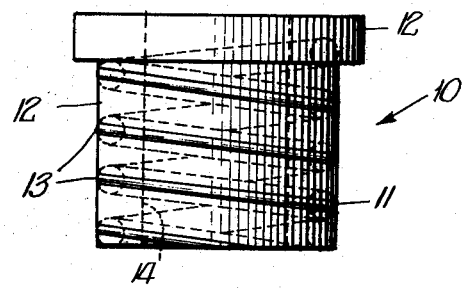
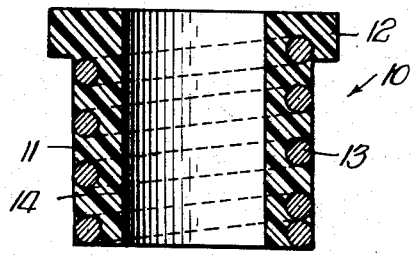
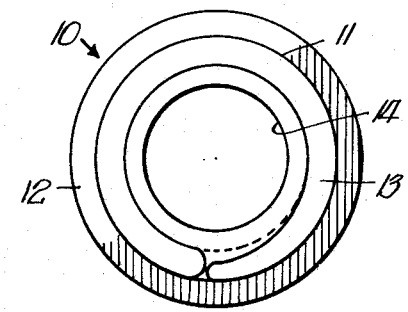
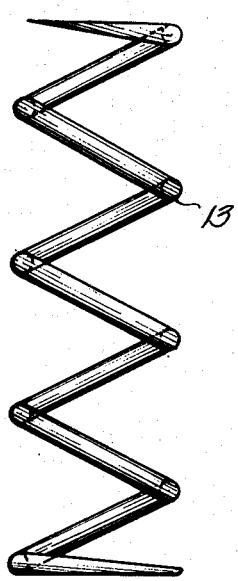
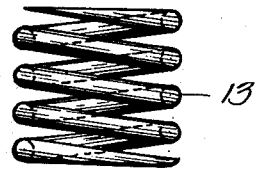
INVENTORS
James P. Morley,
BY Richard W. Blair,
Cromwell, Greist + Warden
ATTYS 3,072,449
Patented Jan. 8, 1963

3,072,449
POLYTETRAFLUOROETHYLENE BUSHING-TYPE
BEARING AND METHOD OF FORMING SAME
James P. Morley, Chicago, and Richard W. Blair, Arlington Heights, Ill., assignors to Chicago Rawhide Mfg. Company, Chicago, Ill., a corporation of Illinois
Filed Apr. 29, 1959, Ser. No. 809,775
3 Claims. (Cl. 308—238)

The present invention is directed to a new and improved bushing-type bearing formed basically from a plastic bearing material with thermal conductor means incorporated therein to prolong the useful life of the bearing material and impart rigidity thereto. More specifically, the present invention is directed to a new bearing of the type described and the method of forming the same, the thermal conductor means being of a nature readily adapting its incorporation in the bearing material during the forming thereof.

Polytetrafluoroethylene is now being rather widely used as bearing material for rotating and/or reciprocating shafts. This material is representative of a class of halogen substituted polyethylene resins which exhibit certain properties particularly adapting them for use in forming hard and generally inert surface material. Polytetrafluoroethylene can be readily shaped by compression molding and permanently set by sintering at a temperature of around 700° F. The resultant material is sufficiently stable, chemically resistant and surface smooth for use in forming shaft supporting bearing surfaces. One type of application of polytetrafluoroethylene as a shaft bearing surface includes the impregnation and in situ sintering of powdered resin on the inner surface of a sintered metallic retainer with the combined materials defining an efficiently operating bearing. However, bearing members of this type are somewhat costly as the sintered metallic carrier or retainer must be separately formed and then subjected to the polytetrafluoroethylene impregnation and in situ sintering operation.

It has been considered particularly advantageous to provide some means by which heat can be conducted from the polytetrafluoroethylene bearing surface to maintain the temperature thereof below those temperatures at which the resin might be damaged by thermal deterioration. The provision of some sort of thermal conducting material adjacent to the resin bearing face has been under consideration for some time but it has been found that the various types of bearing structures proposed or even commercially utilized are rather expensive.

It is an object of the present invention to provide a new and improved bushing-type bearing formed from a halogen substituted polyethylene resin and having imbedded therein a new and improved form of thermal conductor, the combination of these means as hereinafter specified and the method in which the same are combined, providing for a relatively low-cost bearing structure of improved operational aspects.

Another object is to provide a new and improved polytetrafluoroethylene bushing-type bearing having imbedded therein a preformed thermal conductor coil which provides for improved operational use of the bearing.

Still a further object is to provide a new and improved method of forming a polytetrafluoroethylene bushing-type bearing incorporating therein means for improved thermal conductivity.

Other objects not specifically set forth will become apparent from the following detailed description of the invention made in conjunction with the accompanying drawings wherein:

FIG. 1 is an elevation of the bearing of the present invention;

FIG. 2 is a vertical section of the bearing of FIG. 1;
FIG. 3 is a bottom plan view of the bearing;
FIG. 4 is an elevation of the thermal conductor coil ilustrating the same in its initial expanded condition prior to imbedding thereof in the bearing; and
FIG. 5 illustrates the coil of FIG. 4 following compression thereof during formation of the bearing.

FIGS. 1–3 illustrate the bushing-type bearing 10 of the present invention. This bearing has an axially extending sleeve-like bearing portion 11 having formed integrally with one end thereof a radially outwardly projecting circumferential flange 12. The bearing 10 is formed from polytetrafluoroethylene with the main bearing sleeve portion 11 having imbedded therein a metallic coil 13. The coil 13 constitutes a thermal conductor and is preferably formed from solid and continuous metallic material formed into a series of convolutions which extend substantially throughout the entire axial length of the bearing 10. The function of the coil 13 is to conduct heat radially outwardly from the innner polytetrafluoroethylene bearing surface 14 of the bearing 10 to maintain operating temperatures within a safe range for the resinous material. In addition, the coil 13 serves to rigidify the bearing 10 and materially increase the ruggedness of the same.

The general configuration of the bearing 10 exclusive of the imbedded coil 13 therein conforms to a standard type bearing or bushing which is commonly used. Such bearings have been formed from polytetrafluoroethylene by inserting powdered resin in a suitable die cavity, compressing the resin powder therein to preshape or preform the bearing, removing the fragile bearing from the cavity and subjecting the same to high temperatures in the neighborhood of 700° F. to sinter or fuse the compressed powder into a unitary, hard structure. Bearings of this type may be and have been used in many different installational applications. However, it has been found that although the polytetrafluoroethylene provides an extremely desirable bearing surface, the bearing formed therefrom is subject to damage resulting from mechanical failure and from the effect of high temperatures developed during shaft operation. As described above, the provision of the imbedded coil 13 provides means whereby heat is conducted from the bearing surface 14 radially outwardly of the bearing 10 to be dissipated in the surrounding parts of the shaft housing. Furthermore, the continuous coil structure of metallic material imparts rigidity and strength to the polytetrafluoroethylene in which it is imbedded.

In forming the bearing 10, the same general procedure outlined above is followed with the exception that the coil 13 is inserted in the mold cavity and received in the resin powder for fixed imbedding therein during sintering of the preformed article. The coil 13, in effect, replaces a portion of the resin powder and actually results in a savings in cost as the metal coil on the present market is less expensive than the same volumetric quantity of the polytetrafluoroethylene powder. Preferably, the polytetrafluoroethylene is compressed to ¼ of its original volume in its free state, the compression ratio thus being 4 to 1. To conform with this compression ratio, FIGS. 4 and 5 illustrate the coil 13 in its original free state and in its final confined state, respectively. It will be noted that the coil 13 in FIG. 4 is four times its final length as illustrated in FIG. 5. To bring this about, the compression force in the die cavity is applied in an axial direction with respect to the coil and preshaped bushing in which it is to be imbedded. The coil is preferably formed from ductile metallic material, such as aluminum, to result in the coil being imbedded in the finished bearing in static condition. This is a preferred feature as the coil is not intended to load or prestress the sintered polytetrafluoroethylene material forming the bearing.

The actual procedural steps involved in manufacturing the bearing 10 of the present invention are uncomplicated and inexpensive. The open wound coil is placed in the die cavity with this cavity then being filled with powdered polytetrafluoroethylene to substantially surround the coil. Compression is applied axially resulting in the compacting of the resin material and shortening of the original length of the coil to the extent illustrated in FIG. 5. Compression of the coil 13 results in the individual convolutions thereof being moved axially into closer relation to an extent desired in the finished bearing.

Following compression at loads which may range from 2,000 to 15,000 p.s.i. or more, the preformed bearing 10 is removed from the die cavity and subjected to sintering temperatures with the finished product thus being formed. As particularly illustrated in FIGS. 1–3, the coil 13 is located within the sleeve portion 11 of the bearing 10 to provide for a rather substantial and continuous inner bearing surface 14 of polytetrafluoroethylene which may preferably have a thickness of about $\frac{1}{32}$ of an inch. The coil 13 has at least a portion thereof exposed along the outer surface of the sleeve portion 11 of the bearing 10 as clearly shown in FIG. 1. This positioning of the coil 13 provides for efficient heat conduction from the inner bearing surface 14 to the outer surface thereof and into the surrounding surfaces of the shaft housing.

While virgin polytetrafluoroethylene can be used in forming the bearing 10 of the present invention, it is preferred that filled resinous material be used to provide for longer life operation. Suitable filler materials include ground fiberglass, graphite and molybdenum sulphide. The virgin polytetrafluoroethylene will preferably constitute about 80% of the mixture. With 80% virgin polytetrafluoroethylene being used, the filler material may then constitute either 20% ground fiberglass, 15% ground fiberglass and 5% graphite, or 20% molybdenum sulphide, as well as various other combinations of filler materials or other suitable filler materials.

In actual operational use of the type of bearing disclosed, it has been found that the life of the bearing is at least twice that of a conventional polytetrafluoroethylene bearing. This substantial extension of useful life is, of course, attributable to the incorporation of the static coil 13 in the bearing 10. The efficient thermal conduction and improved rigidity provided by the coil greatly extends the useful life of the polytetrafluoroethylene. This particular resin is preferred as it exhibits self-lubricating properties and the type of bearing described may be used in dry bearing applications. While the particular bearing configuration disclosed is of special commercial importance, it will be understood that the invention should not be limited to this specific configuration but that the principles of the present invention may be readily applied to other types of sleeve-like bearings capable of accommodating the static coil 13 in the manner described.

Obviously certain modifications and variations of the invention as hereinbefore set forth may be made without departing from the spirit and scope thereof, and therefore only such limitations should be imposed as are indicated in the appended claims.

We claim:
1. A bushing-type bearing formed from sintered polytetrafluoroethylene and having embedded therein a coiled thermal conductor which is formed from solid ductile metallic material and is in static condition throughout to avoid stressing said polytetrafluoroethylene, at least substantially all of the coils of said conductor being only partially but axially continuously exposed along the outer surface of said bearing for direct thermal conduction therefrom, the inner surface of said bearing being defined by uninterrupted polytetrafluoroethylene of substantial depth.

2. The bearing of claim 1 wherein the inner surfaces of said coils are spaced from the inner surface of said bearing on the order of at least about $\frac{1}{32}$ of an inch.

3. The bearing of claim 1 wherein said conductor is formed from aluminum.

References Cited in the file of this patent

UNITED STATES PATENTS

| | | |
|---|---|---|
| 2,456,262 | Fields | Dec. 14, 1948 |
| 2,459,598 | Stott | Jan. 18, 1949 |
| 2,622,949 | Cotchett | Dec. 23, 1952 |
| 2,702,730 | Ivanoff et al. | Feb. 22, 1955 |
| 2,781,552 | Gray | Feb. 19, 1957 |
| 2,815,253 | Spriggs | Dec. 3, 1957 |
| 2,831,737 | Jacoby | Apr. 22, 1958 |
| 2,989,355 | Terhorst | June 20, 1961 |